(12) United States Patent
Suzuki

(10) Patent No.: US 6,595,307 B2
(45) Date of Patent: Jul. 22, 2003

(54) HYBRID VEHICLE CAPABLE OF REDUCING NOX EMISSIONS AND METHOD OF OPERATING SAME

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2 days.

(21) Appl. No.: 09/963,458

(22) Filed: Sep. 27, 2001

(65) Prior Publication Data

US 2002/0049115 A1 Apr. 25, 2002

(30) Foreign Application Priority Data

Oct. 25, 2000 (JP) .......................................... 2000-325182

(51) Int. Cl.[7] .............................................. B60K 6/00
(52) U.S. Cl. ........................................ 180/65.2; 60/274
(58) Field of Search ............................. 180/65.2, 65.3, 180/65.4, 309; 60/274, 284, 285, 286, 299, 300, 301, 302, 303

(56) References Cited

U.S. PATENT DOCUMENTS

| | | | | |
|---|---|---|---|---|
| 5,319,921 A | * | 6/1994 | Gopp | 60/274 |
| 5,492,190 A | * | 2/1996 | Yoshida | 180/65.4 |
| 5,566,774 A | * | 10/1996 | Yoshida | 180/65.4 |
| 5,628,186 A | * | 5/1997 | Schmelz | 60/274 |
| 5,785,937 A | * | 7/1998 | Neufert et al. | 423/213.2 |
| 5,842,341 A | * | 12/1998 | Kibe | 60/274 |
| 5,845,487 A | * | 12/1998 | Fraenkle et al. | 60/274 |
| 5,862,497 A | * | 1/1999 | Yano et al. | 701/22 |
| 5,875,864 A | * | 3/1999 | Yano et al. | 180/65.4 |
| 6,131,538 A | * | 10/2000 | Kanai | 123/2 |
| 6,138,784 A | * | 10/2000 | Oshima et al. | 180/65.2 |
| 6,220,019 B1 | * | 4/2001 | Sugiura et al. | 60/285 |

FOREIGN PATENT DOCUMENTS

| | | |
|---|---|---|
| JP | 7-255104 A | 10/1995 |
| JP | 11-107826 A | 4/1999 |
| JP | 11-178111 A | 7/1999 |
| JP | 2000-54826 A | 2/2000 |

* cited by examiner

Primary Examiner—Brian L. Johnson
Assistant Examiner—Kelly E Campbell
(74) Attorney, Agent, or Firm—Oliff & Berridge, PLC

(57) ABSTRACT

In a hybrid vehicle including an internal combustion engine, an electric motor, a generator, a battery, and a catalytic converter disposed in an exhaust system of the engine, a determination is made as to whether a condition for stopping the engine is established, based on an operating state of the vehicle. Then, the fuel supply to the engine is cut off when the condition for stopping the engine is established, and a load (for example, a load of the generator) is applied to the engine so as to restrict rotation of the engine.

20 Claims, 3 Drawing Sheets

HYBRID VEHICLE CAPABLE OF REDUCING NOX EMISSIONS AND METHOD OF OPERATING SAME

INCORPORATION BY REFERENCE

The disclosure of Japanese Patent Application No. 2000-325182 filed on Oct. 25, 2000, including the specification, drawings and abstract is incorporated herein by reference in its entirety.

BACKGROUND OF THE INVENTION

1. Field of Invention

The invention relates generally to a hybrid vehicle that is driven by a suitable combination of an internal combustion engine and an electric motor, in view of savings of energy resources and environmental protection, and in particular to such a hybrid vehicle, and method of operating same, in which the quantity of NOx discharged or released into the atmosphere is reduced.

2. Description of Related Art

It has been proposed to temporarily stop an internal combustion engine of a vehicle, such as an automobile, during an operation of the vehicle, for the sake of savings of energy resources and environmental protection, when certain conditions under which the engine is allowed or desired to be temporarily stopped are established. In fact, this technology has been implemented in some types of automobiles. The conditions for temporarily stopping the engine may be established when, for example, the vehicle stops at a red traffic light, or the vehicle stops or travels at a considerably low speed because of a traffic jam, or the like.

The above-described technology of temporarily stopping the engine may be employed in a hybrid vehicle including an engine, an electric motor, a generator and a battery. In the hybrid vehicle, power can be transmitted among the engine, the motor and the generator, and the motor uses the battery as an electric power supply. The hybrid vehicle may be driven by one or both of the engine and the motor. Namely, the hybrid vehicle runs by means of a selected one or both of the output of the engine and the output of the motor. Furthermore, the generator is driven when appropriate by utilizing one or both of the output of the engine and the inertia of the running vehicle, so as to charge the battery. A known example of a hybrid vehicle is disclosed in Japanese Laid-open Patent Publication No. 7-255104.

The hybrid vehicle as described above has been developed so as to achieve improved environmental protection as one of its important objects. To accomplish this object, an exhaust system of the engine is provided with a catalytic converter including a catalyst, such as a three-way catalyst, for removing harmful substances, such as NOx, CO and HC, which are contained in exhaust gases emitted from the engine.

The hybrid vehicle as described above is able to operate appropriately even with a considerably high frequency of stopping of the engine, provided that the combination of the engine and the electric motor, along with the generator and the battery, operates in a well-balanced manner in accordance with operating or driving circumstances of the vehicle. However, the following problem arises if the catalytic converter is provided in the exhaust system of the hybrid vehicle that undergoes frequent stoppage of the engine. Namely, while the engine is stopped by initially cutting off fuel supply into the engine, the engine that has been rotating does not immediately stop rotating due only to the cut-off of the fuel supply, but rather keeps rotating for a while due to inertia. During the continued rotation of the engine, intake air that is rich in oxygen is discharged as it is into the catalytic converter, and the oxygen is trapped or stored in the catalytic converter each time the engine is stopped. If the engine is re-started in this condition, HC or CO that is fed to the catalytic converter along with NOx in the exhaust gas tends to react with the oxygen stored in the catalytic converter, rather than reacting with NOx under the effect of the catalytic converter so as to convert NOx into harmless $N_2$. Consequently, an undesirably large quantity of NOx is discharged from the engine without being removed by the catalytic converter.

SUMMARY OF THE INVENTION

It is therefore an object of the invention to provide a hybrid vehicle that is able to reduce the quantity of NOx emitted from an engine, by preventing a catalytic converter from storing a large quantity of oxygen, and to a method of operating same.

To accomplish the above and/or other objects, there is provided according to one aspect of the invention a hybrid vehicle including: (a) a power train including an internal combustion engine, an electric motor, and a generator, which are operatively connected to each other, at least one of an output of the engine and an output of the electric motor being utilized for running the hybrid vehicle, (b) a battery electrically connected to the electric motor and to the generator, the electric motor using the battery as an electric power supply, at least one of the output of the engine and inertia of the running hybrid vehicle being utilized for driving the generator so as to charge the battery, and (c) a catalytic converter disposed in an exhaust system of the engine so as to purify an exhaust gas emitted from the engine. In the hybrid vehicle, a controller determines whether a condition for stopping the engine is established, based on an operating state of the vehicle, and cuts off fuel supply to the engine when the condition for stopping the engine is established. After cutting off fuel supply to the engine, a load (e.g., a load of the generator) is applied to the engine so as to restrict rotation of the engine. Thus, the generator gives resistance to rotation of the engine, thereby preventing the engine from rotating due to inertia soon after the fuel supply is cut off. Since a large quantity of intake air that is rich in oxygen is thus prevented from being discharged from the rotating engine into the catalytic converter, it is possible to reduce the quantity of NOx that is released to the atmosphere without being removed by the catalytic converter upon a re-start of the engine.

In one preferred embodiment of the invention, the temperature of the catalytic converter is determined through detection or estimation, and the engine is kept rotating (i.e., the fuel supply to the engine is not cut off) irrespective of establishment of the condition for stopping the engine if the temperature of the catalytic converter is higher than a predetermined threshold level. When the vehicle is in an operating state in which the catalyst temperature is higher than the predetermined threshold level, the catalytic converter is more likely to trap oxygen contained in the exhaust gas. If the condition for stopping the engine is established while the vehicle is in this operating state, a control operation to stop the engine is not performed or is temporarily suspended. Thus, oxygen contained in the intake air is prevented from being trapped by and stored in the catalytic converter, and the quantity of NOx that is released to the atmosphere without being removed by the catalytic converter is reduced. In this case, the total time during which the engine is stopped may be reduced, but it is still advantageous to keep the engine rotating rather than stopping the engine, in view of the savings of the energy resources and the environmental protection.

In another preferred embodiment of the invention, the hybrid vehicle further includes a shut-off valve disposed upstream of the catalytic converter in the exhaust system of the engine, and the shut-off valve is closed when the engine is stopped. With the shut-off valve thus closed, exhaust gas that is emitted during idling of the engine after cut-off of fuel supply is blocked at a point upstream of the catalytic converter, and thus oxygen contained in the exhaust gas is prevented from being trapped by and stored in the catalyst. When the shut-off valve is opened upon a re-start of the engine, the same quantity of oxygen as that blocked by the shut-off valve flows into the catalytic converter, but the ability of the catalyst to remove NOx from the exhaust gas is not deteriorated so much as that in the case where no shut-off valve is provided upstream of the catalytic converter and excessive oxygen is stored in the catalytic converter before the engine is re-started.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
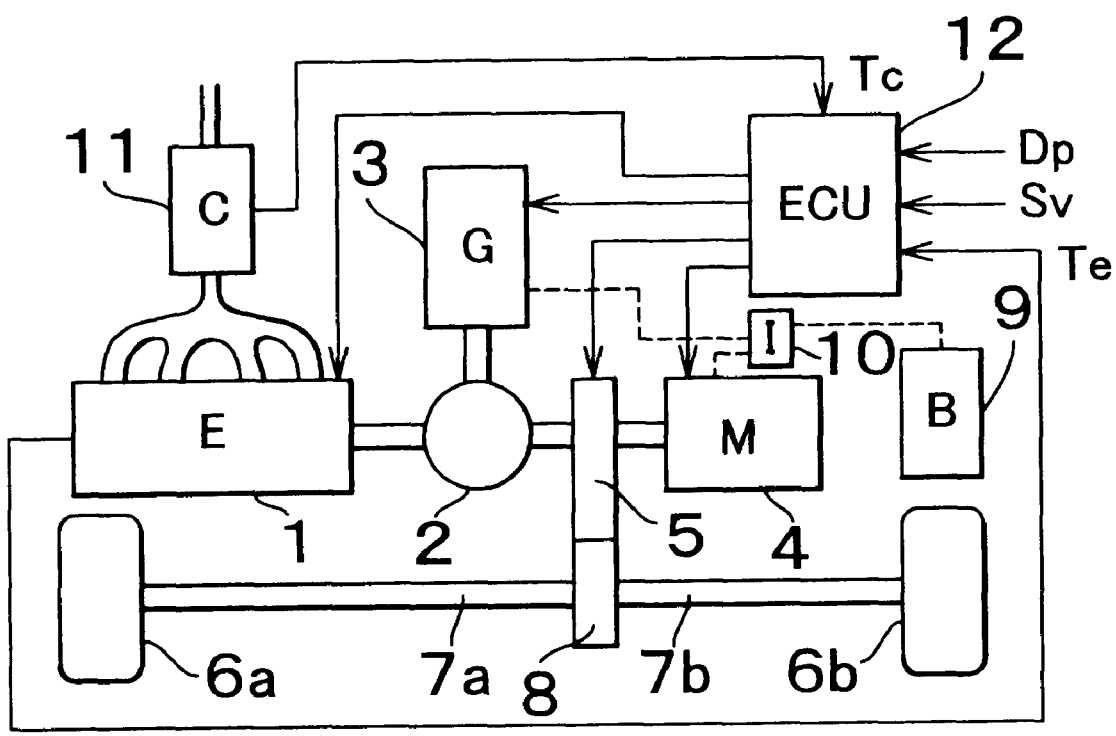
FIG. 1 is a view schematically showing the construction of a power-train system of a hybrid vehicle according to one preferred embodiment of the invention.

FIG. 1 schematically shows the construction of a power-train system employed in a hybrid vehicle according to one preferred embodiment of the invention. In FIG. 1, an internal combustion engine 1 is operatively connected to a generator 3 and a motor 4 via a drive coupling device 2 including a planetary gear set, such that power is transmitted among the engine 1, the generator 3 and the motor 4. The engine 1, the drive coupling device 2, the generator 3 and the motor 4 constitute a drive assembly for driving the hybrid vehicle. A transmission 5 is coupled to the drive assembly via a shaft of the motor 4. In operation, power is transmitted between the drive assembly of the engine 1, the generator 3, and the motor 4, and drive wheels 6a, 6b of the vehicle, via the transmission 5 and a pair of driving axles 7a, 7b. In the embodiment of FIG. 1, a differential gear system 8 is incorporated in the transmission 5, such that power for rotating the wheels 6a, 6b may be differentially transmitted to the driving axles 7a, 7b via the transmission 5.

A battery 9 is electrically connected to the generator 3 and to the motor 4 via an inverter 10. The generator 3 functions to charge the battery 9 by generating power when the vehicle is driven under its inertia (e.g., during coasting or braking of the vehicle) or by the engine 1 during deceleration. The motor 4 functions to drive the vehicle as needed, using the battery 9 as an electric power supply. While the generator 3 and the motor 4 are separately provided in the embodiment of FIG. 1, a so-called "motor/generator" as an integral device may be employed in place of the generator 3 and the motor 4. The motor/generator selectively functions as a motor or as a generator, and the function of the motor/generator may be changed through switching of an electric circuit incorporated therein.

A catalytic converter 11 in the form of a three-way catalyst, or the like, is provided in an exhaust system of the engine 1. An electronic control unit 12 controls the operations of the engine 1, the generator 3, the motor 4 and the transmission 5 in the manners as described below, so as to operate the hybrid vehicle according to the invention. The electronic control unit 12 receives various types of information relating to the operation of the vehicle, which information may include a signal indicative of an amount Dp of depression of an accelerator pedal, a signal indicative of a vehicle speed Sv, a signal indicative of a temperature Te of the engine 1, and a signal indicative of a temperature Tc of the catalytic converter 11.

Figure 2:
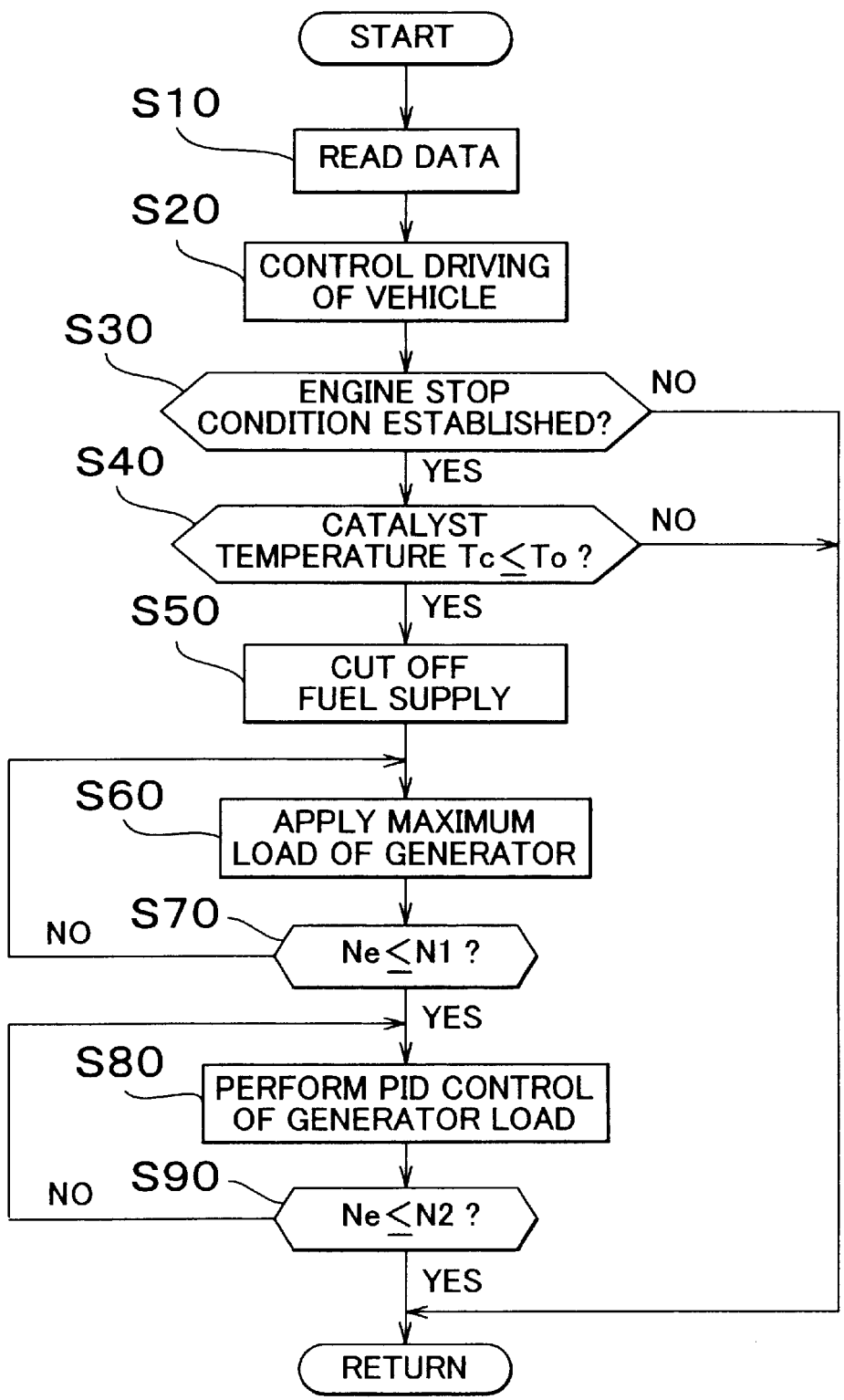
FIG. 2 is a flowchart illustrating one example of driving control including control of stopping the engine of the hybrid vehicle according to an embodiment of the invention.

Referring next to the flowchart of FIG. 2, the operation of the hybrid vehicle constructed as shown in FIG. 1 will be described in detail. It is to be understood that the flowchart of FIG. 2 illustrates all possible control steps that may be executed for controlling the hybrid vehicle according to various aspects of the invention, but all of these steps are not necessarily required for practicing the invention. In other words, one or more of the steps illustrated in the flowchart of FIG. 2 may be omitted, as described later.

When the vehicle starts operating upon closing (turn-on) of a key switch (not shown), step S10 is initially executed to read necessary data, such as the amount Dp of depression of the accelerator pedal, the vehicle speed Sv, the engine temperature Te, and the catalyst temperature Tc, as shown in FIG. 1. In step S20, driving control of the vehicle is performed on the basis of the data read in step S10. The driving control may include, among other things, vehicle speed control and steering control in accordance with a steering operation by a driver of the vehicle. While the driving control is performed in accordance with the driver's intention, it is determined in step S30 whether a condition or conditions for stopping the engine 1 during the operation of the vehicle is/are established. If a negative decision (NO) is obtained in step S30, namely, if the conditions for stopping the engine are not established, the current cycle of the control routine is terminated, and control returns to step S10.

When it is determined in step S30 that the conditions for stopping the engine are established, namely, when the engine 1 is allowed or desired to be temporarily stopped, control proceeds to step S40. The conditions are established, for example, when the vehicle stops at a red traffic light for a predetermined period of time or longer, or the vehicle runs at a considerably low speed or stops for a predetermined period of time or longer. In step S40, it is determined whether the catalyst temperature Tc is equal to or lower than a predetermined threshold level To. If an affirmative decision (YES) is obtained in step S40, control proceeds to step S50. If a negative decision (NO) is obtained in step S40, the current cycle of the control routine is terminated, and control returns to step S10 without performing engine stop control as described below. The threshold level To of the catalyst temperature is determined such that when the temperature of the catalytic converter 11 is higher than the threshold level To, it is more advantageous to keep the engine 1 operating without temporarily stopping it in view of the quantity of NOx emitted from the engine 1, rather than to temporarily stop the engine 1 for the sake of saving the fuel. In this connection, it is to be noted that some NOx is inevitably emitted from the engine even when the engine is re-started after it is stopped in the manner as described below by executing steps S50 to S90, though the quantity of NOx thus emitted can be reduced through the engine stop control of steps S50 to S90.

The above-described step S40, however, is not essential to the principle of the invention, and therefore this step may be omitted. According to the principle of the invention, when the conditions for stopping the engine 1 are established, fuel supply to the engine 1 is cut off or stopped, and then a load of the generator 3 is applied to the engine 1 so as to restrict or suppress rotation of the engine 1. In other words, the generator 3 gives resistance to rotation of the engine 1, thereby inhibiting the engine from rotating due to its inertia soon after cut-off of the fuel supply. The engine will stop rotating much more quickly when the load of the generator is applied to it than it would if the load of the generator is not applied to the engine. Since intake air that is rich in oxygen is thus prevented as far as possible from being discharged from the engine into the catalytic converter, it is possible to reduce the quantity of NOx that is released to the atmosphere without being removed by the catalytic converter upon a re-start of the engine.

Turning to the flowchart of FIG. 2, if an affirmative decision (YES) is obtained in step S40 (or in step S30 if step S40 is not performed), control proceeds to step S50 to cut off fuel supply to one of the cylinders of the engine 1, and then successively cut off fuel supply to the remaining cylinders. Then, the engine stop control according to the invention is performed in the following steps. In this embodiment, a load of the generator 3 is initially maximized in step S60, and the maximized load is applied to the engine 1. Generally, the engine is temporarily stopped when the vehicle is temporarily stopped or runs at a considerably low speed. In such cases, the driving axles 7a, 7b are probably disconnected from the engine 1 and the generator 3 by the transmission 5, or may be disconnected from the engine 1 and the generator 3 without causing any problem. If the electronic control unit 12 performs control to disconnect the axles 7a, 7b from the engine 1 and the generator 3, almost no shock is transmitted to the drive wheels even if the maximum load of the generator 3 is applied to the engine 1 to rapidly restrict rotation of the engine 1.

In step S70, it is determined whether the engine speed Ne is equal to or lower than a predetermined threshold value N1 (which is equal to, for example, about 100 rpm). Namely, the maximum load of the generator 3 is kept applied to the engine 1 until the engine speed Ne is reduced down to the threshold value N1. If an affirmative decision (YES) is obtained in step S70, control proceeds to step S80 to perform PID (Proportional-Integral-Differential) control of the generator load. The PID control is terminated when it is determined in step S90 that the engine speed Ne is equal to or lower than a predetermined threshold value N2 (which is equal to, for example, about 10 rpm). While the generator load is applied in two different ways in the present embodiment, the control operations performed in steps S60 and S70 or the control operations performed in steps S80 and S90 may be omitted. It is to be understood that the maximum load of the generator 3 in step S60 does not necessarily mean the maximum load that can be applied by the generator 3, but may be a sufficiently large load of the generator that can be applied to the engine at a time to rapidly restrict rotation of the engine 1.

Figure 3:
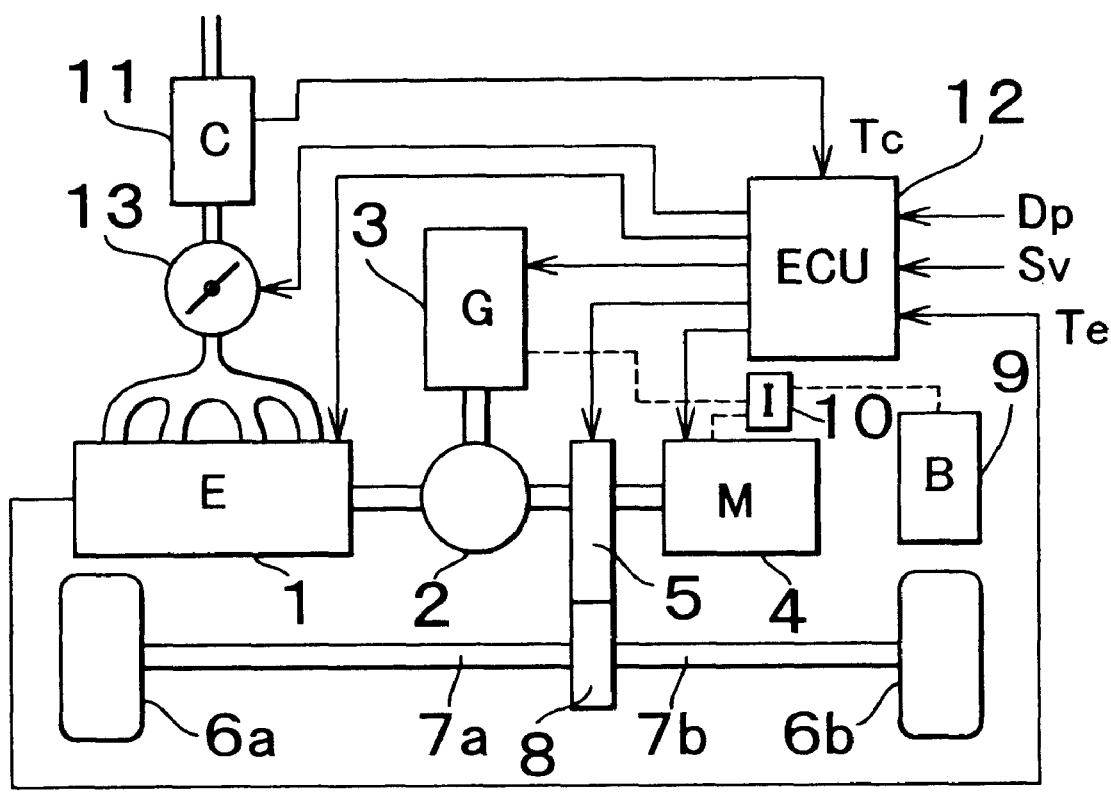
FIG. 3 is a view schematically showing a modified example of the power-train system of the hybrid vehicle as shown in FIG. 1.

FIG. 3 shows another embodiment of the invention in which a shutoff valve 13 is provided upstream of the catalytic converter 11 in the engine exhaust system of FIG. 1. The shut-off valve 13 thus provided is opened and closed under control of the electronic control unit 12. If the shut-off valve 13 is closed in suitable timing following cut-off of fuel supply in step S50, while the engine stop control is being performed in steps S60 to S90, exhaust gas that is rich in oxygen is prevented from immediately entering the catalytic converter after the cut-off of the fuel supply. Although the exhaust gas that has been blocked by the shut-off valve 13 must be discharged through the catalytic converter 11 when the engine is re-started, the oxygen that is contained in the exhaust gas but not trapped or stored in the catalytic converter is less likely to impede or affect removal of NOx through reaction with HC or CO. Thus, the shut-off valve 13 prevents oxygen from being trapped or stored in the catalyst, so as to reduce the quantity of NOx emitted from the engine when the engine is re-started.

It is also possible to apply a load to the engine other than a load from the generator. However, it is particularly advantageous to apply a load from the generator to the engine since the generator already is selectively connectable to the engine (e.g., it is coupled to the engine when the engine is used to drive the generator in order to charge the battery), and therefore no additional structure is needed.

In the illustrated embodiment, a controller (the ECU 12) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A hybrid vehicle comprising:
   a power train including an internal combustion engine, an electric motor, and a generator, which are operatively connected to each other, at least one of an output of the engine and an output of the electric motor being utilized for running the hybrid vehicle;
   a battery electrically connected to the electric motor and to the generator, the electric motor using the battery as an electric power supply, at least one of the output of the engine and inertia of the running hybrid vehicle being utilized for driving the generator so as to charge the battery;

a catalytic converter disposed in an exhaust system of the engine so as to purify an exhaust gas emitted from the engine; and a controller that:
   determines whether a condition for stopping the engine is established, based on an operating state of the vehicle;
   cuts off fuel supply to the engine when the condition for stopping the engine is established; and
   applies a load of the generator to the engine upon the cutting off of the fuel supply to the engine, wherein the controller determines a temperature of the catalytic converter, and keeps the engine rotating irrespective of establishment of the condition for stopping the engine if the determined temperature of the catalytic converter is higher than a predetermined threshold level.

2. A hybrid vehicle according to claim 1, wherein the electric motor and the generator are integrated as a motor/generator that selectively functions as the motor or as the generator.

3. A hybrid vehicle according to claim 1, wherein the condition for stopping the engine is established when the vehicle is stopped for a predetermined period of time or longer.

4. A hybrid vehicle according to claim 1, wherein the load of the generator is applied to the engine until a speed of the engine becomes less than a threshold speed.

5. A hybrid vehicle comprising:
   a power train including an internal combustion engine, an electric motor, and a generator, which are operatively connected to each other, at least one of an output of the engine and an output of the electric motor being utilized for running the hybrid vehicle;
   a battery electrically connected to the electric motor and to the generator, the electric motor using the battery as an electric power supply, at least one of the output of the engine and inertia of the running hybrid vehicle being utilized for driving the generator so as to charge the battery;
   a catalytic converter disposed in an exhaust system of the engine so as to purify an exhaust gas emitted from the engine; and
   a controller that:
      determines whether a condition for stopping the engine is established, based on an operating state of the vehicle;
      cuts off fuel supply to the engine when the condition for stopping the engine is established; and
      applies a load of the generator to the engine upon the cutting off of the fuel supply to the engine; and
   a shut-off valve disposed upstream of the catalytic converter in the exhaust system of the engine, wherein the controller closes the shut-off valve upon the cutting off of the fuel supply to the engine.

6. A hybrid vehicle according to claim 5, wherein the electric motor and the generator are integrated as a motor/generator that selectively functions as the motor or as the generator.

7. A hybrid vehicle according to claim 5, wherein the condition for stopping the engine is established when the vehicle is stopped for a predetermined period of time or longer.

8. A hybrid vehicle according to claim 5, wherein the load of the generator is applied to the engine until a speed of the engine becomes less than a threshold speed.

9. A hybrid vehicle, comprising:
   a power train including an internal combustion engine, an electric motor, and a generator, which are operatively connected to each other, at least one of an output of the engine and an output of the electric motor being utilized for running the hybrid vehicle;
   a battery electrically connected to the electric motor and to the generator, the electric motor using the battery as an electric power supply, at least one of the output of the engine and inertia of the running hybrid vehicle being utilized for driving the generator so as to charge the battery;
   a catalytic converter disposed in an exhaust system of the engine so as to purify an exhaust gas emitted from the engine; and
   a controller that:
      determines whether a condition for stopping the engine is established, based on an operating state of the vehicle;
      cuts off fuel supply to the engine when the condition for stopping the engine is established; and
      applies a load of the generator to the engine upon the cutting off of the fuel supply to the engine, wherein the load of the generator applied to the engine is controlled in a first manner until a speed of the engine is reduced to a first threshold value, and is then controlled in a second manner when the speed of the engine is reduced from the first threshold value to a second threshold value that is lower than the first threshold value.

10. A hybrid vehicle according to claim 9, wherein the load of the generator applied to the engine is subjected to Proportional-Integral-Differential control when the speed of the engine is reduced from the first threshold value to the second threshold value.

11. A method of controlling a hybrid vehicle that includes: (a) a power train including an internal combustion engine, an electric motor, and a generator, which are operatively connected to each other, at least one of an output of the engine and an output of the electric motor being utilized for running the hybrid vehicle, (b) a battery electrically connected to the electric motor and to the generator, the electric motor using the battery as an electric power supply, at least one of the output of the engine and inertia of the running hybrid vehicle being utilized for driving the generator so as to charge the battery, and (c) a catalytic converter disposed in an exhaust system of the engine so as to purify an exhaust gas emitted from the engine, the method comprising the steps of:
   determining whether a condition for stopping the engine is established, based on an operating state of the vehicle;
   cutting off fuel supply to the engine when the condition for stopping the engine is established;
   applying a load of the generator to the engine upon the cutting off of the fuel supply to the engine;
   determining a temperature of the catalytic converter; and
   keeping the engine rotating irrespective of establishment of the condition for stopping the engine if the determined temperature of the catalytic converter is higher than a predetermined threshold level.

12. A method according to claim 11, wherein the electric motor and the generator are integrated as a motor/generator that selectively functions as the motor or as the generator.

13. A method according to claim 11, wherein the condition for stopping the engine is established when the vehicle is stopped for a predetermined period of time or longer.

14. A method according to claim 11, wherein the load of the generator is applied to the engine until a speed of the engine becomes less than a threshold speed.

15. A method, of controlling a hybrid vehicle that includes: (a) a power train including an internal combustion engine, an electric motor, and a generator, which are operatively connected to each other, at least one of an output of the engine and an output of the electric motor being utilized for running the hybrid vehicle, (b) a battery electrically connected to the electric motor and to the generator, the electric motor using the battery as an electric power supply, at least one of the output of the engine and inertia of the running hybrid vehicle being utilized for driving the generator so as to charge the battery, and (c) a catalytic converter disposed in an exhaust system of the engine so as to purify an exhaust gas emitted from the engine, the method comprising the steps of:

determining whether a condition for stopping the engine is established, based on an operating state of the vehicle;

cutting off fuel supply to the engine when the condition for stopping the engine is established;

applying a load of the generator to the engine upon the cutting off of the fuel supply to the engine; and closing the shut-off valve upon the cutting off of the fuel supply to the engine; wherein the vehicle further includes a shut-off valve disposed upstream of the catalytic converter in the exhaust system of the engine.

16. A method according to claim 15, wherein the electric motor and the generator are integrated as a motor/generator that selectively functions as the motor or as the generator.

17. A method according to claim 15, wherein the condition for stopping the engine is established when the vehicle is stopped for a predetermined period of time or longer.

18. A method according to claim 15, wherein the load of the generator applied to the engine is controlled in a first manner until a speed of the engine is reduced to a first threshold value, and is then controlled in a second manner when the speed of the engine is reduced from the first threshold value to a second threshold value that is lower than the first threshold value.

19. A method of controlling a hybrid vehicle that includes: (a) a power train including an internal combustion engine, an electric motor, and a generator, which are operatively connected to each other, at least one of an output of the engine and an output of the electric motor being utilized for running the hybrid vehicle, (b) a battery electrically connected to the electric motor and to the generator, the electric motor using the battery as an electric power supply, at least one of the output of the engine and inertia of the running hybrid vehicle being utilized for driving the generator so as to charge the battery, and (c) a catalytic converter disposed in an exhaust system of the engine so as to purify an exhaust gas emitted from the engine, the method comprising the steps of:

determining whether a condition for stopping the engine is established, based on an operating state of the vehicle;

cutting off fuel supply to the engine when the condition for stopping the engine is established; and applying a load of the generator to the engine upon the cutting off of the fuel supply to the engine, wherein the load of the generator applied to the engine is controlled in a first manner until a speed of the engine is reduced to a first threshold value, and is then controlled in a second manner when the speed of the engine is reduced from the first threshold value to a second threshold value that is lower than the first threshold value.

20. A method according to claim 19, wherein the load of the generator applied to the engine is subjected to Proportional-Integral-Differential control when the speed of the engine is reduced from the first threshold value to the second threshold value.

* * * * *